United States Patent
Warkotsch et al.

(12) 
(10) Patent No.: US 6,290,446 B1
(45) Date of Patent: Sep. 18, 2001

(54) QUICK ACTION NUT FOR FIXING THE WHEEL RIM OF A VEHICLE WHEEL ON AN END OF A SHAFT OF A BALANCING MACHINE, SAID END HAVING AN OUTER THREAD

(75) Inventors: Dirk Warkotsch; Harald Oppermann, both of Wettmar (DE); Guy W. Carter, Cheltenham (GB)

(73) Assignee: Haweka Auswuchttechnik Horst Warkotsch GmbH, Burgwedel (DE)

( * ) Notice: Subject to any disclaimer, the term of this patent is extended or adjusted under 35 U.S.C. 154(b) by 0 days.

(21) Appl. No.: 09/424,833

(22) PCT Filed: May 27, 1998

(86) PCT No.: PCT/EP98/03116

§ 371 Date: Dec. 2, 1999

§ 102(e) Date: Dec. 2, 1999

(87) PCT Pub. No.: WO98/57137

PCT Pub. Date: Dec. 17, 1998

(30) Foreign Application Priority Data

Jun. 11, 1997 (DE) ............................................... 197 24 523

(51) Int. Cl.[7] ............................. F16B 37/08; G01M 1/04
(52) U.S. Cl. ........................................... 411/433; 411/432
(58) Field of Search .................................. 411/432, 433, 411/437, 435, 278, 916, 14.4

(56) References Cited

U.S. PATENT DOCUMENTS

| | | | |
|---|---|---|---|
| 2,760,393 | * | 8/1956 | Stough . |
| 3,905,429 | | 9/1975 | Berger . |
| 4,332,169 | * | 6/1982 | Stuart . |
| 4,531,872 | * | 7/1985 | Warkotsh . |
| 4,955,744 | * | 9/1990 | Barth . |
| 5,186,516 | * | 2/1993 | Alexander . |
| 5,253,967 | * | 10/1993 | Orban . |
| 5,749,691 | * | 5/1998 | Campbell . |
| 5,755,544 | * | 5/1998 | Muller . |

FOREIGN PATENT DOCUMENTS

| | | |
|---|---|---|
| 28 13387 C2 | 10/1978 | (DE) . |
| 2935216A1 | 3/1981 | (DE) . |
| 33 27 635 C2 | 2/1985 | (DE) . |
| 3605821A1 | 8/1987 | (DE) . |
| 42 00 380 C2 | 7/1993 | (DE) . |

OTHER PUBLICATIONS

International Search Report, PCT/EP98/03116, May 5, 1998.

* cited by examiner

*Primary Examiner*—Flemming Saether
(74) *Attorney, Agent, or Firm*—Shlesinger Arkwright & Garvey, LLP

(57) ABSTRACT

A speed clamping nut to clamp the rim of a vehicle wheel on an end fitted with an outer thread of a shaft of a balancing machine, comprising a housing having at least one grip mounted in substantially radially manner to the housing, and an inside thread. A threaded component rotational about the screw axis of the speed clamping nut and relative to the housing is connected to the housing and comprises an inside thread and is connected with the drive side of a rotational drive system connected to the housing. Following engagement, the rotational drive system assumes the complex and time-consuming screwing-on procedure when the wheel rim is pulled against spring forces toward a centering cone.

19 Claims, 5 Drawing Sheets

QUICK ACTION NUT FOR FIXING THE WHEEL RIM OF A VEHICLE WHEEL ON AN END OF A SHAFT OF A BALANCING MACHINE, SAID END HAVING AN OUTER THREAD

FIELD OF THE INVENTION

The invention relates to a quick-action nut, herein called speed clamping nut, for loading a vehicle wheel rim onto the threaded end of a shaft of balancing machine.

BACKGROUND OF THE INVENTION

A speed clamping nut of this sort is known form the German patent document A1 36 05 821 and is used in particular to affix a vehicle wheel on the loading shaft of balancing machine. The nut comprises a housing with grips mounted at diametrically opposite sites. Two threaded components are mounted in radially displaceable manner inside the housing and are spring-loaded radially inward toward a meshing position of the thread. The thread segments can be manually moved radially outward against the spring force into a disengaged position.

This known speed clamping nut is used in such a way that first the vehicle wheel to be balanced is slipped by its central hole on the shaft of the balancing machine. Then the speed clamping nut with disengaged thread segments is axially slipped on the shaft of the balancing machine, whereupon the drive means to disengage the thread segments are relaxed and as a result the thread segments are made to engage by the spring so that the inside threads of the threaded components engages the outside thread at the end of the shaft of the balancing shaft. Thereupon the speed clamping nut is rotated by means of the grips affixed to the housing until the vehicle wheel rim has been clamped. This screw-tightening over a comparatively long clamping path must take place in the face of somewhat significant forces and as a result this operation is fairly laborious. Those forces arise foremost because a centering cone is mounted in axially displaceable manner on the shaft when centering the rim, a strong spring being mounted on the back side of said cone and forcing the cone into the rim's centering hole when affixing the wheel. This radial centering position is reached before the rim reaches its affixation position wherein it comes to rest against a stop flange, most often in the shape of a dome and mounted on the shaft of the balancing machine, the rim then being clamped in position against stop by means the clamping nut. To assure that the centering cone shall reliably be in the center position even when there are centering holes for rims of different diameters, the location of radial centering and hence the beginning of the screwing-on operation against the spring force at the back side of the centering cone frequently is remote from the final clamping point. As a result the screwing-on path of the speed clamping nut against the spring force is comparatively long and explains the cause of the laborious and time-consuming tightening of the speed clamping nut.

The German patent document C2 42 00 380 discloses apparatus to mount a motor vehicle wheel to a motor driven main shaft of a wheel balancing machine and to remove said wheel from it, where clamping is implemented using a tension rod displaceable axially in the direction of the main shaft, the rod being made to engage by its one end the wheel by a tensioning system while a tension is generated at its other end. This known apparatus is exceedingly complex and difficult to handle. Furthermore clamping nuts to affix a vehicle wheel on the loading shaft of a balancing machine are known from the German patent documents C2 29 35 216 and C2 33 27 635, wherein radially disengageable thread segments are made to engage a thread on the shaft of the balancing machine for purposes of loading. These machines therefore incur the same drawbacks as the speed clamping nut of the initially cited German patent document A1 36 05 821. The German patent document C2 28 13 387 discloses a balancing machine for motor vehicle wheels where the loading of the motor vehicle wheel is implemented by a tension rod passing through the hollow balancing shaft. This design is costly and clumsy in handling.

OBJECTS AND SUMMARY OF THE INVENTION

The objective of the invention is to create a speed clamping nut of the pertinent kind which shall facilitate and accelerate clamping, the speed clamping nut comprising a housing having at least one grip mounted in substantially radially manner to the housing and an inside thread. A threaded component rotational about the screw axis of the speed clamping nut and relative to the housing is provided and connected to the housing and comprises an inside thread and is connected with the drive side of a rotational drive system connected to the housing. Following engagement, the rotational drive system assumes the complex and time-consuming screwing-on procedure when the wheel rim is pulled against spring forces toward a centering cone.

The basic concept of the invention is to fit the speed clamping nut with a rotational drive system assuming the screwing-on procedure over the long path of threading the nut and carrying out this procedure rapidly and without taxing the operator. The rotational drive system does not rotate the entire housing, instead only a threaded component containing the inside thread and which is rotatable about the axis of the speed clamping nut and relative to the housing. The operator is merely left with the simple task to keep holding the speed clamping nut housing by means of the grips mounted on latter and to absorb the torques in this manner. Using the grips, furthermore, the operator is able to increase the screwing torque manually at the end of the screwing-on procedure, namely by a short displacement of the grips in the direction of screwing. In the same manner the operator can loosen the speed clamping nut, whereupon again the rotational drive system can take charge of the longer unscrewing path.

In one embodiment of the invention, the rotational drive system is mounted in one grip. It is basically feasible to equip the rotational drive system for a short time during its operation with an external power supply. However an appropriate embodiment of the invention mounts an energy storage means for the rotational drive system in the housing and/or one grip. The energy required for the screwing-on procedure being comparatively low, the energy storage means may be relatively small and therefore may be housed in one grip. To increase the storable energy, another embodiment of the invention provides four grips mounted crosswise on the housing, one grip receiving the rotational drive system and the others the energy storage means.

When the rotational drive system is mounted in a grip, its drive shaft appropriately is operationally connected by an angled, preferably bevel gear to the threaded component. If the grip slants relative to the axis of rotation of the speed clamping nut away from the direction of tightening, the gear drive appropriately shall be a conical gear drive.

At sufficiently high speed of the rotational drive system, latter also may be used to overcome the path of screwing-on wherein as yet substantial tensioning forces do not arise. Nevertheless, in implementation of the basic concept of the invention, the threaded component is fitted with two thread segments prestressed radially inward by an engaging spring into the engagement position, actuation means being provided to displace the thread segments against the force of the engaging spring into a disengaging position. The speed clamping nut of the invention is then able, as is the initially described known speed clamping nut, to be slipped axially onto and over the shaft of the balancing machine when the thread segments are disengaged until substantially tightening forces do arise. Thereupon the actuation means are relaxed and as a result the engaging spring moves the thread segments into the engaging position and thereby the speed clamping nut assumes its function as a nut. Thereupon the screwing-on action proper can be carried out by the rotational drive system in the manner described above.

In the last discussed embodiment, the thread segments appropriately are prestressed radially outward by a disengaging spring and as a result the force exerted by the disengaging spring is so much weaker than that exerted by the engaging spring that the thread segments are continuously kept engaged without the actuating means being driven. Appropriately the actuating means are operationally connected by a cam drive to the thread segments. The design of the above cited springs assures that the cam drive is constantly engaged.

Appropriately the cam drive comprises an actuation ring which is irrotationally affixed to the threaded component and which is fitted with a conical inside surface to come to rest against conical shoulders of the thread segments. The actuation means comprise a disengaging fork in the form of a two-arm lever and fitted at the ends of its prongs with radially inward projecting pins entering an outer annular slot in the actuation ring, the other arm of said fork constituting an actuating arm prestressed opposite the engaging spring direction of actuation. In this embodiment the cam drive rotates together with the rotatable threaded component, that is, there is no relative rotation between them and consequently the cam drive will not be loaded by such motions. The actuation forces are solely transmitted through the pins at the ends of the disengaging fork's prongs which enter the inwardly projecting slot of the actuation ring.

Appropriately a switch to reverse the direction of rotation of the rotational drive system is mounted on the speed clamping nut. Such switches appropriately may be two pushbutton switches, one switching ON the rotational drive system in one direction and the other switching ON the rotational drive means in the other direction. Appropriately the switch or switches are located in the vicinity of a grip so that they may actuated for instance by the thumb when this grip is held manually.

Appropriately the rotational drive means comprise an electric motor, the energy storage means being a battery or a storage battery. The storage battery can be charged in known manner between operations of the speed clamping nut by this speed clamping nut being moved into a position wherein its terminals touch terminals of a charging system. Obviously too, known inductive transfer of a charging voltage may be implemented, in which event a rectifier must be incorporated into the speed clamping nut.

In another appropriate embodiment, the rotational drive means consist of a compressed-air motor. This embodiment offers the advantage that the tire shops using the speed clamping nut in connection with tire balancing often are equipped with compressed-air sources which may be utilized to power the rotational drive means. In this instance too an energy storage means may be fitted into the speed clamping nut, namely in the form of a pressurized chamber in one or more grips.

Appropriately the rotational drive means will be self-locking. This feature offers the advantage that the speed clamping nut can be used in conventional manner as a manually operated nut if so desired or if an energy source for the rotational drive means is unavailable or exhausted.

BRIEF DESCRIPTION OF THE DRAWINGS

The invention is elucidated below in relation to embodiments shown in the drawings.

DETAILED DESCRIPTION OF THE PREFERRED EMBODIMENTS

Figure 1:
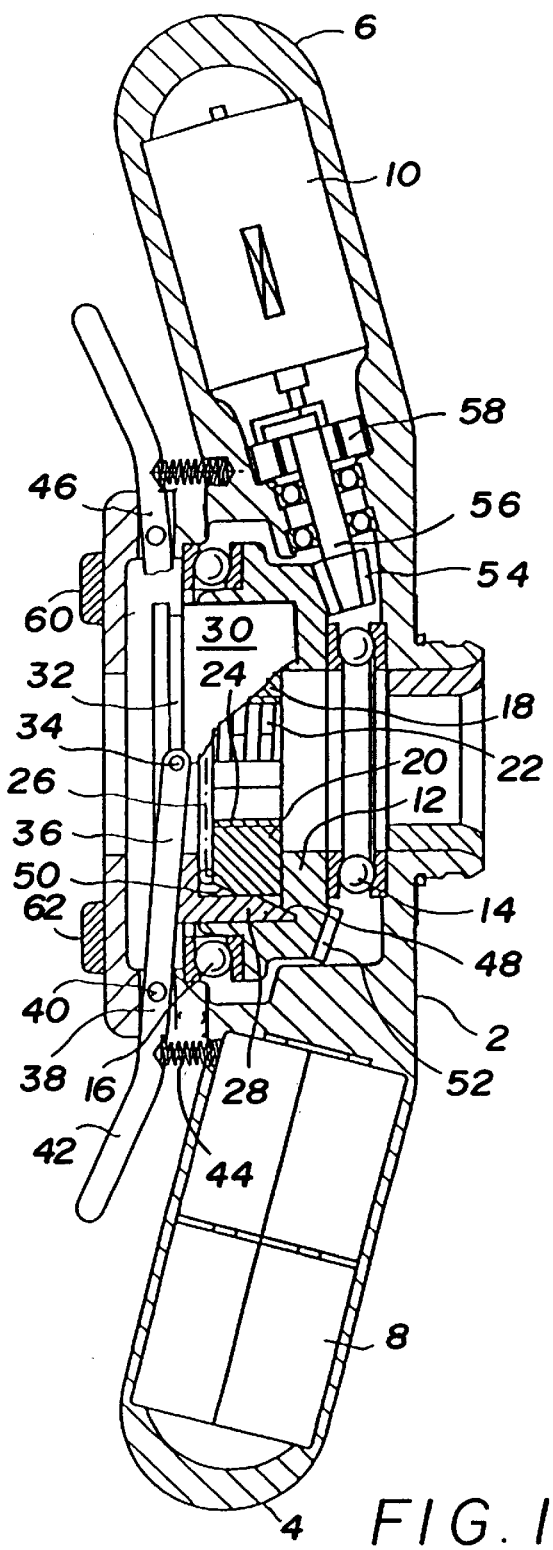
FIG. 1 shows a cross-section of the speed clamping nut of the invention in the engaged position.

FIG. 1 shows a speed clamping nut comprising a housing 2 to which are mounted radial grips 4 and 6. The grip 4 houses storage batteries 8 powering an electric motor 10 housed in grip 6.

A threaded component 12 is received in housing 2 and is rotatably supported therein by ball bearings 14 and 16. The threaded-component 12 comprises two radially displaceable thread segments 18 and 20 each fitted with an inside thread 22 and 24. The thread segments 18 and 20 are outwardly prestressed by a disengaging spring 26. Because of such prestressing, said segments rest against an inside surface of a cylindrical extension 28 of an actuation ring 30 fitted with an outer annular slot 32 entered by pins 34 situated at the ends of prongs 36 of a disengaging fork 38 in the form of a two-arm lever rotatable about a pin 40 and of which the other arm constitutes an actuation arm 42 prestressed by an engaging spring 44. Besides the disengaging fork 38, there is another disengaging fork 46 situated diametrically opposite in the region of the grip 6 and identical in design with the disengaging fork 38. Accordingly the corresponding reference numbers have been omitted as regards the disengaging fork 46.

The cylindrical extension 28 of the actuation ring 30 comprises a conical inside surface 48 acting as a slide, and this extension cooperates by means of a conical shoulder 50 with the thread segments 18 and 20.

The thread-component 12 comprises a conical gear rim 52 engaging a conical gear 54 driven from the electric motor 10 by means of a shaft 56 and a planetary gear 58.

As regards the engaged position shown in FIG. 1, the engaging spring 44 already has forced the actuation arm 42 toward the left of the drawing and thereby has forced to the right the pins 34 affixed to the prongs 36. In this process the pins 34 engaging the annular slot 32 force the actuation ring 30 to the left in the drawing and as a result the conical inside surface 48 has slipped over the conical shoulders 50 of the threaded segments 18 and 20 and has forced these radially inward into the engaged position. In the shown final position, the cylindrical inside surface of the cylindrical extension 28 completely rests on the outside of the threaded segments 18 and 20 whereby the latter are held in geometrically interlocking manner in the engaged position.

Figure 2:
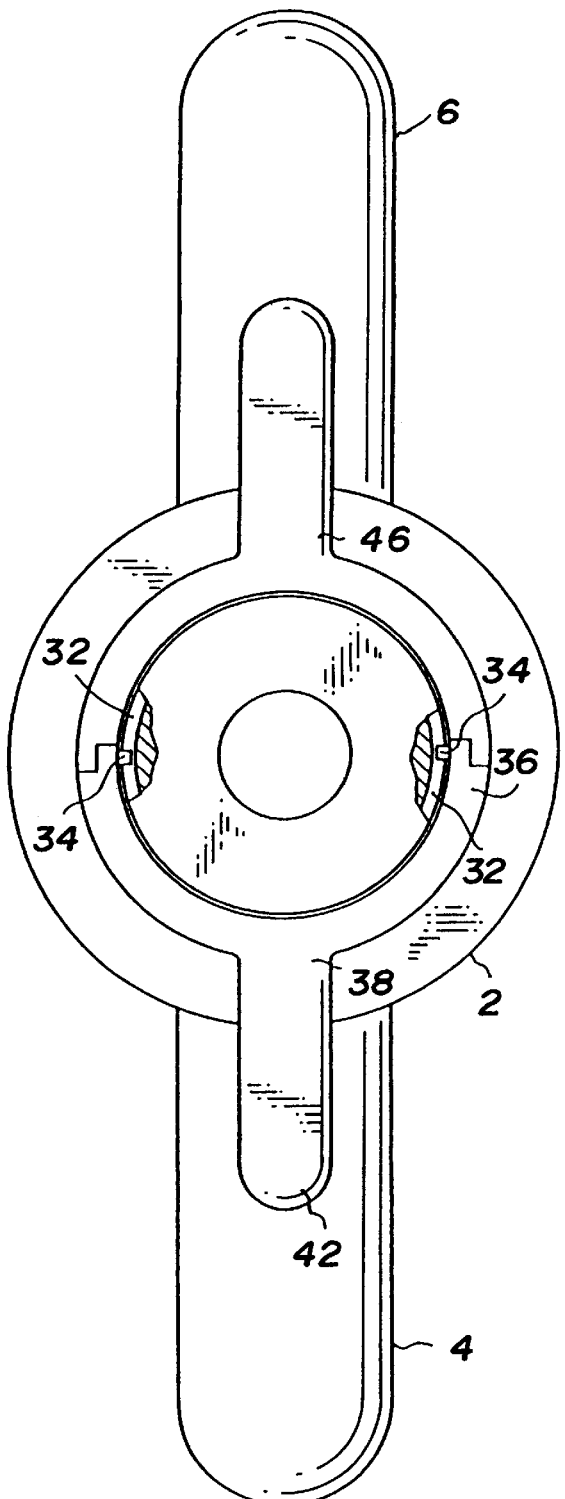
FIG. 2 is a topview of FIG. 1, FIG. 3 corresponds to FIG. 1 and shows the speed clamping nut in the disengaged position.

FIG. 2 shows the speed clamping nut of FIG. 1 from the left, parts of the housing being cut away in the region of the pins 34 in order to elucidate the engagement of these pins in the annular slot 32.

Figure 3:
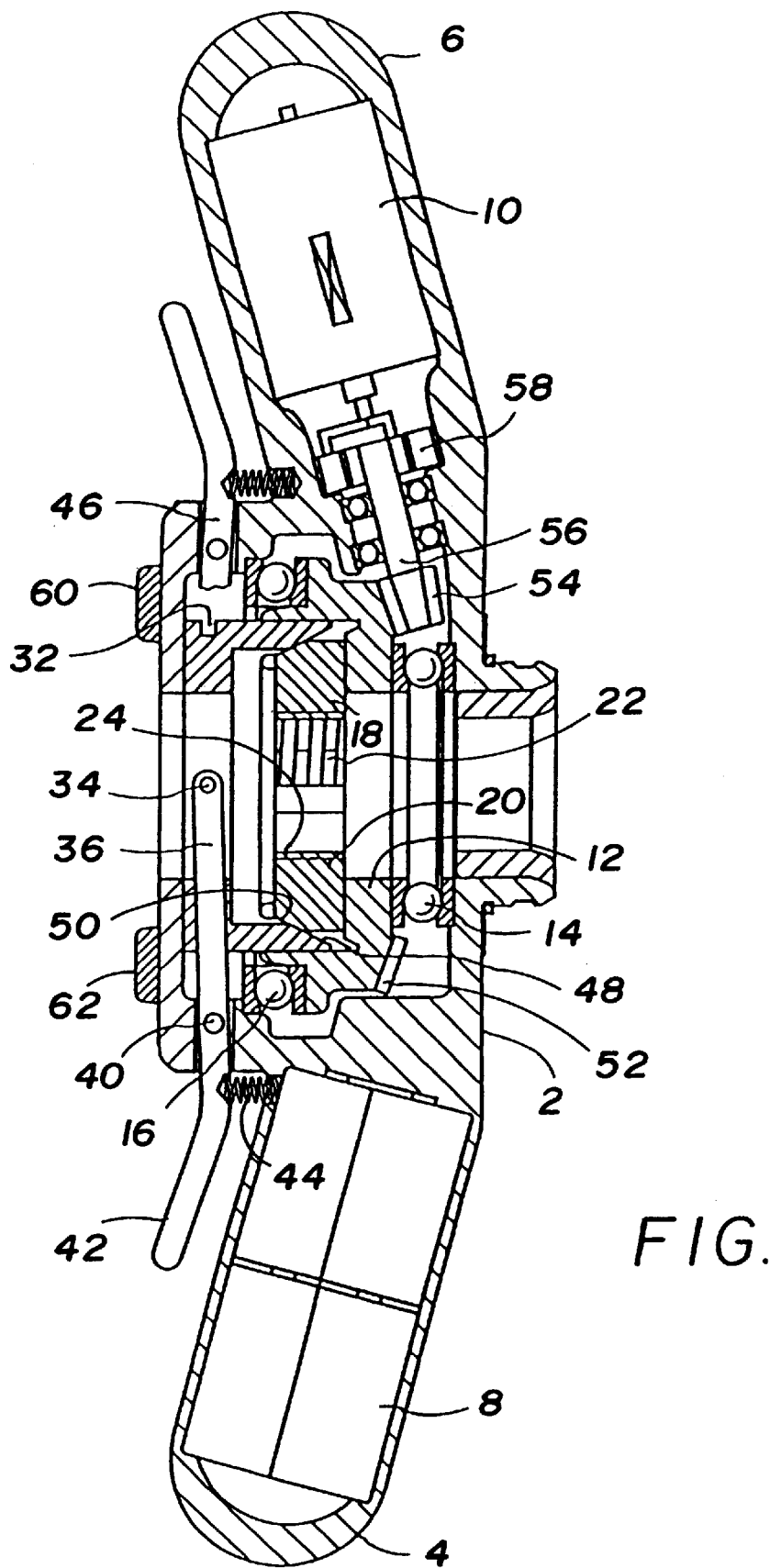

FIG. 3 shows the speed clamping nut of FIG. 1 in the disengaged position. In this position, the operator by his (omitted) thumb has pressed the actuation arm 42 toward the right against the force of the engaging spring 44 and as a result he has moved the actuation ring 30 toward the left by means of the pins 34 engaging the annular slot 32. Consequently the conical inside surface 48 of the actuation ring 30 opens the way to the outside for the threaded segments 18 and 20 whereby, driven by the force of the spring 26, they can move outward. As a result the inside threads 22 and 24 of the threaded segments 18 and 20 move into the disengaged position, and the entire speed clamping nut can be freely slipped onto an outside thread of a shaft of the balancing machine.

The electric motor 10 can be switched into different directions of rotation by means of merely schematically indicated pushbutton switches 60 and 62.

When using a speed clamping nut shown in FIGS. 1 through 3, first a vehicle wheel to be balanced is slipped by its central centering hole onto the end of a shaft of a balancing machine until the centering hole impacts a centering cone fitted with a compression spring at its back. Thereupon the speed clamping nut is moved into a disengaged position by driving the actuation arms 42 and is displaced until coming to rest against the wheel rim. Then the drive arms 42 are relaxed, whereby the inside threads 22 and 24 engage the complementary outside thread on the end of the shaft of the balancing machine. Then the pushbutton switch 60 of the electric motor 10 is actuated to move the said motor in a direction of rotation in which, by means of the gear 54 and the gear rim 52 this motor rotates the threaded component 12 in the direction of screw tightening. During this time the speed clamping nut is kept irrotational by means of the grips 4 and 6. When the end, i.e. the clamping position has been reached, the pushbutton switch 60 is relaxed and the circuit to the electric motor 10 is cut. If required, the operator may still manually tighten the speed clamping nut using the grips 4 and 6 and thereby increase the clamping force.

After the affixed vehicle wheel has been balanced, the electric motor 10 is turned ON in the reverse direction of rotation by means of the pushbutton switch 62 and thereby the speed clamping nut is loosened to such an extent that the force exerted from behind by the compression spring behind the centering cone on the wheel rim has substantially subsided. Thereupon the threaded segments 18 and 20 are disengaged by driving the actuation arms 42 and as a result the speed clamping nut can be completely removed from the shaft and thereafter the vehicle can be removed.

Figure 4:
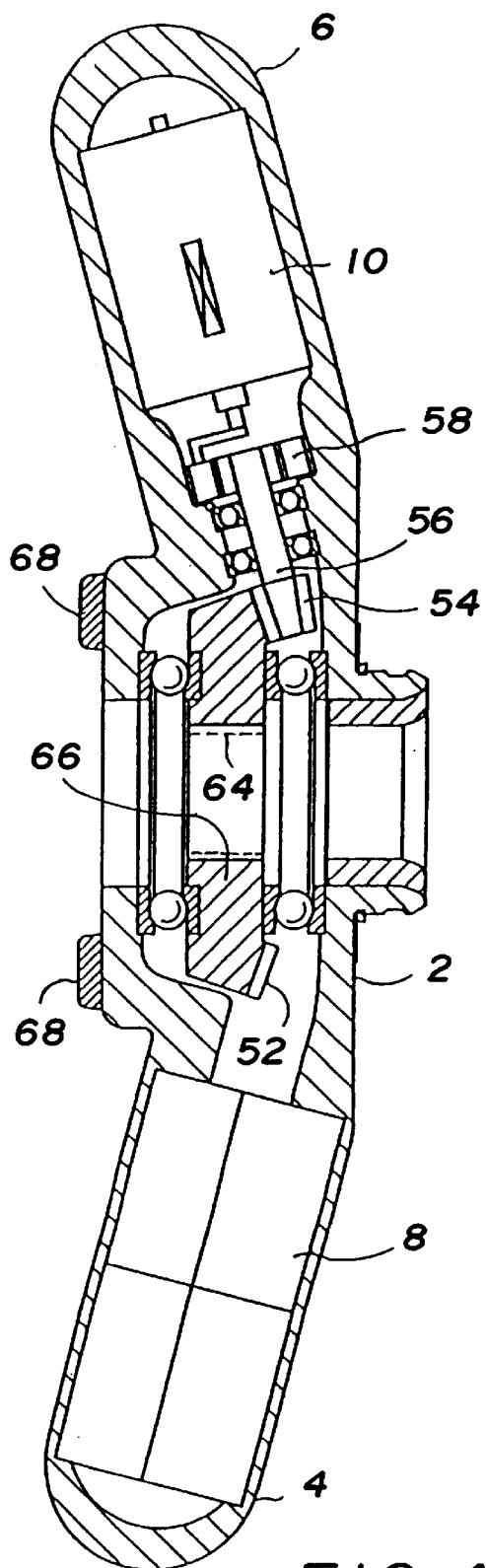
FIG. 4 shows a second embodiment of the invention in radial section similarly to FIG. 1.

FIG. 4 is a radial cross-section similar to FIG. 1 of another embodiment of the invention wherein the engaging and disengaging means for the threaded segments have been omitted. Identical or corresponding components are denoted by the same reference numerals. In this embodiment an inside thread 64 is directly present on the threaded component 66. This embodiment will be appropriate when the shaft end of a balancing machine projecting beyond a wheel rim is only moderately long. In such a case moreover the electric motor must be a series-wound one to offer high speed at low load and low speed at high load and high torque.

Figure 5:
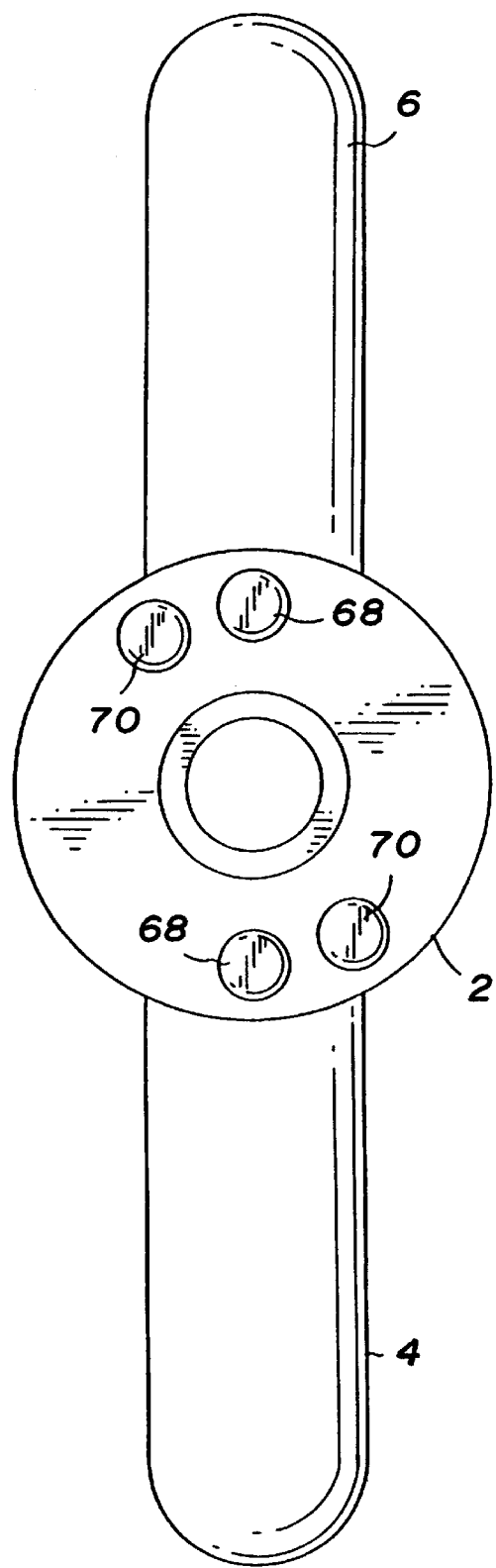
FIG. 5 is a topview of FIG. 4.

FIG. 5 shows the speed clamping nut of FIG. 4 on the left of the drawing. Pushbutton switches 68 and 70 are mounted in the vicinity of the grips 4 and 6 each, one being a turn-ON switch for one direction of rotation and the other the turn-ON switch for another direction of rotation.

Figure 6:
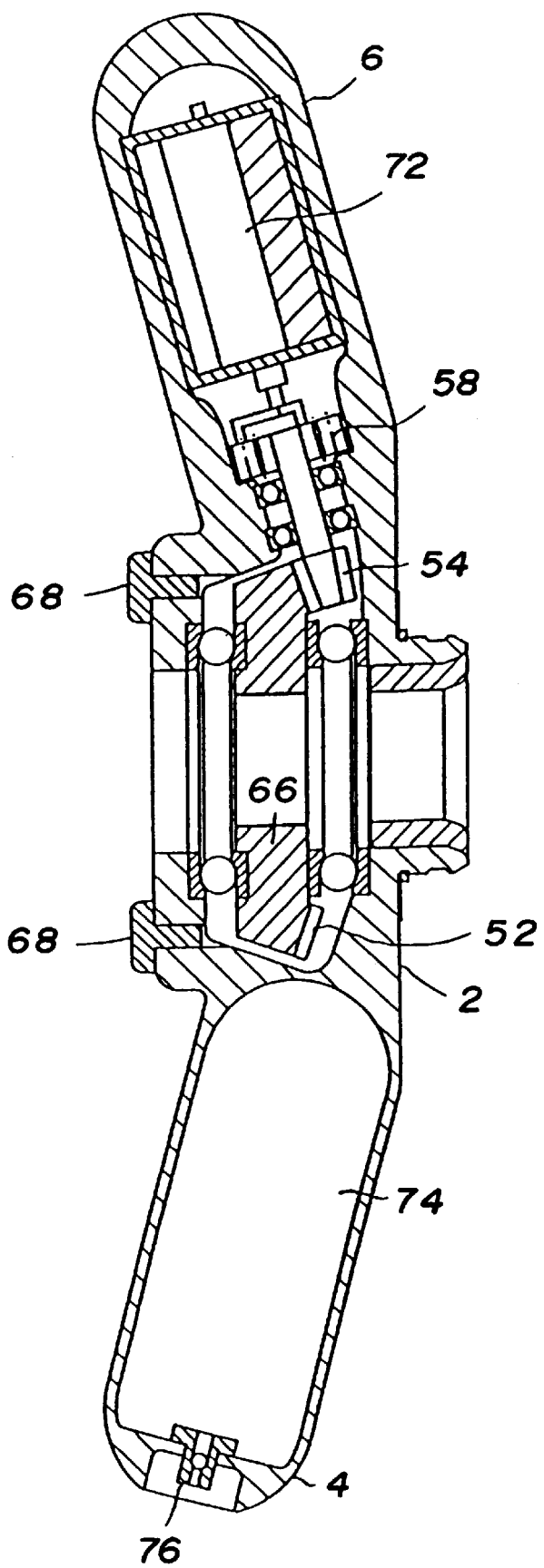
FIG. 6 is a radial cross-section of an embodiment comprising compressed-air power.

FIG. 6 shows a further embodiment similar to that of FIG. 4 in the same cross-sectional representation. Identical or corresponding components are denoted by the same references. The difference is that the motor is a compressed air motor 72 fed with compressed air from a pressure chamber 74 filled through a valve 76.

Figure 7:
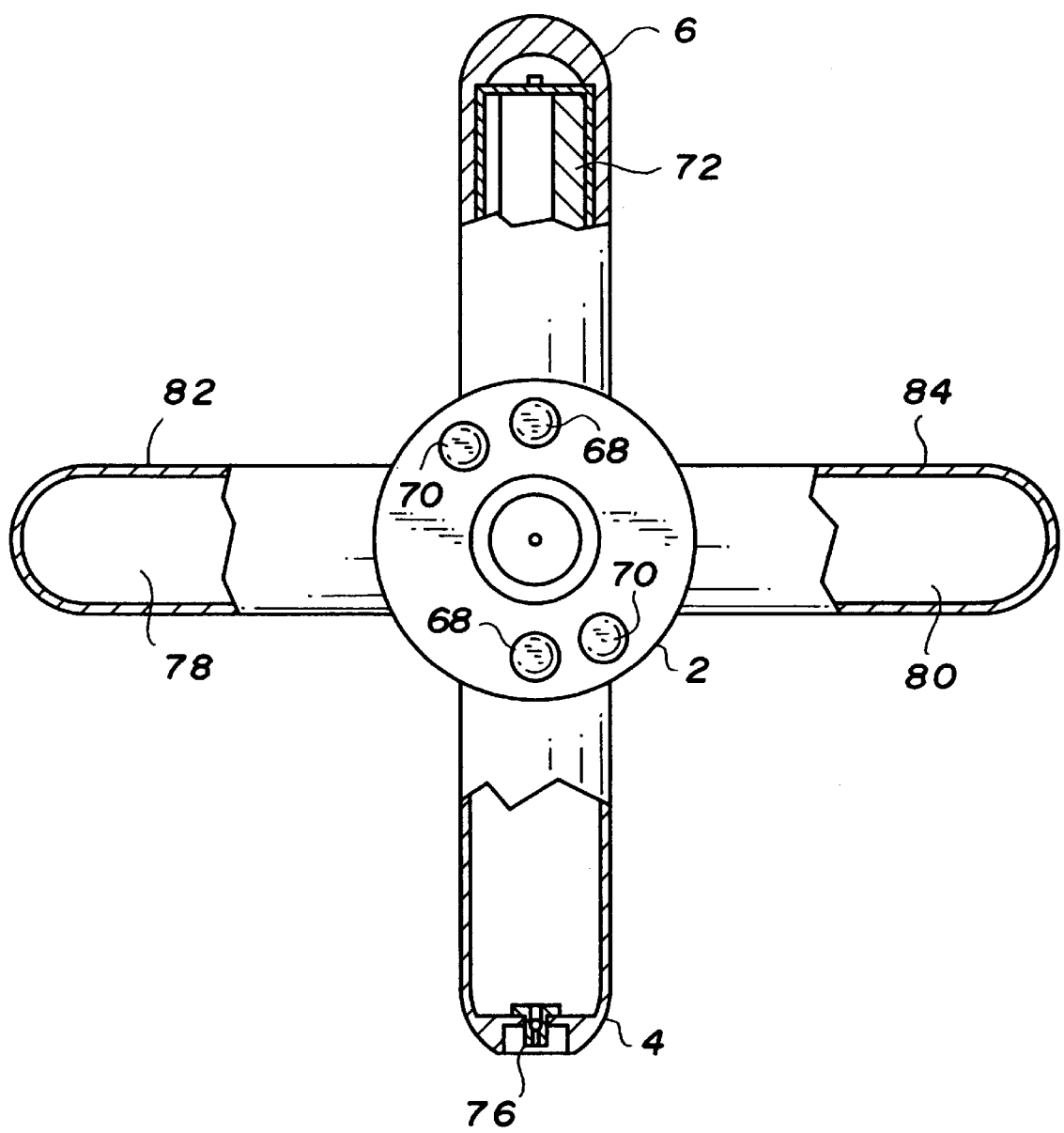
FIG. 7 is a topview of FIG. 6.

FIG. 7 is a top view of FIG. 6 from the left. Beside the pressure chamber 74, there are four further pressure chambers 78 and 80 in further grips 82 and 84 mounted crosswise to increase the quantity of stored compressed air.

We claim:

1. A speed clamping nut adapted for clamping the rim of a vehicle wheel onto a threaded shaft of a wheel balancing machine, said clamping nut comprising:
   a) a housing;
   b) a passageway extending through said housing, said passageway having a central axis;
   c) at least one grip member, said at least one grip member mounted to said housing and extending radially therefrom;
   d) a threaded component configured to threadedly engage a shaft of a balancing machine, said threaded component connected to said housing and coaxially aligned therewith, said threaded component having a rotational axis;
   e) an actuator, said actuator mounted in said housing and operably associated with said threaded component for moving said threaded component radially into and out of engagement with the shaft of a balancing machine; and
   f) a rotational drive system, said drive system is mounted in said at least one grip member and adapted to provide rotation of said threaded component relative to said housing.

2. A speed clamping nut as in claim 1 and further comprising;
   a) at least one energy storage device, said at least one energy storage device is operatively associated with said rotational drive system and mounted in at least one of said housing and said at least one grip member.

3. A speed clamping nut as in claim 2 and wherein:
   a) said rotational drive system includes a compressed air motor.

4. A speed clamping nut as in claim 3 and wherein:
   a) said at least one energy storage device comprises a pressurized chamber, said pressurized chamber is mounted in said at least one grip member.

5. A speed clamping nut as in claim 2 and further comprising;
   a) second, third and fourth grip members, each of said second third and fourth grip member mounted to said housing and extending radially therefrom in a crosswise manner and adapted to receive further energy storage devices.

6. A speed clamping nut as in claim 1 and wherein:
   a) said drive system includes a bevel drive connected to said threaded component.

7. A speed clamping nut as in claim 6 and wherein:
a) said bevel drive is a gear drive.

8. A speed clamping nut as in claim 7 and wherein:
a) said at least one grip member is positioned away from and transverse to the rotational axis of said threaded member and said gear drive is a conical gear drive.

9. A speed clamping nut as in claim 1 and wherein:
a) said threaded component including at least one threaded segment and a cooperating engaging spring for prestressing said at least one threaded segment radially inward toward said engaged position, said engaging spring further associated with said actuator for selectively countering the prestressing force of said engaging spring.

10. A speed clamping nut at in claim 9 and wherein:
a) said at least one threaded segment further including a cooperating disengaging spring for prestressing said at least one threaded segment radially outward toward said disengaged position, the force exerted by said disengaging spring less than that of said engaging spring so that in the absence of operation of said actuator said at least one treaded segment is maintained in said engaged position.

11. A speed clamping nut as in claim 9 and further comprising:
a) a cam drive, said cam drive adapted to operatively associate said actuator to said at least one threaded segment.

12. A speed clamping nut as in claim 11 and wherein:
a) said cam drive including an acutation ring irrotationally affixed to said at least one threaded component and provided with at least one conical inside surface adapted to abut against a complementary conical shoulder portion provided on said at least one threaded segment to cause movement of the same, said acutator further including a pair of opposed disengaging forks having respective prong members forming a two-arm lever, each of said respective prong members having provided at respective ends thereof pin members extending transverse thereto, said pin members being received radially inwardly within an outer annular slot provided in said actuation ring, at least one arm of said two-arm lever is prestressed by said engaging spring in a manner opposed to the direction of acutation effected thereby.

13. A speed clamping nut as in claim 1 and further comprising:
a) a switch mechanism, said switch mechanism for at least one of actuating said rotational drive system or reversing the direction of travel of said rotational drive system, said switch mechanism is mounted on said speed clamping nut.

14. A speed clamping nut as in claim 13 and wherein:
a) said switch mechanism is at least one of mounted on or inside said housing and in the vicinity of said at least one grip member.

15. A speed clamping nut at in claim 1 and further comprising:
a) first and second pushbutton switches, said first and second pushbutton switches are mounted to said speed clamping nut, said first pushbutton switch actuates a first direction of travel for said rotational drive system and said second pushbutton switch actuates a second direction of travel for said rotational drive system.

16. A speed clamping nut as in claim 15 and wherein:
a) said first and second pushbutton switches are at least one of mounted on or inside said housing and in the vicinity of said at least one grip member.

17. A speed clamping nut at in claim 1 and wherein:
a) said rotational drive system includes an electric motor.

18. A speed clamping nut as in claim 2 and wherein:
a) said at least one energy storage device comprises at least one of a battery or a storage battery.

19. A speed clamping nut as in claim 1 and wherein:
a) said rotational drive system is self-locking.

* * * * *